(12) United States Patent
Kraemer (10) Patent No.: US 8,741,239 B2
(45) Date of Patent: Jun. 3, 2014

(54) METHOD AND APPARATUS FOR OPERATION OF CO/VOC OXIDATION CATALYST TO REDUCE NO₂ FORMATION FOR GAS TURBINE

(75) Inventor: Gilbert O. Kraemer, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/392,327

(22) Filed: Feb. 25, 2009

(65) Prior Publication Data

US 2010/0215558 A1    Aug. 26, 2010

(51) Int. Cl.
| B01D 47/00 | (2006.01) |
| B01D 53/14 | (2006.01) |
| B01D 53/48 | (2006.01) |
| C01B 31/18 | (2006.01) |
| B01D 53/56 | (2006.01) |

(52) U.S. Cl.
USPC ........ 423/210; 423/246; 423/224; 423/418.2; 423/235

(58) Field of Classification Search
None
See application file for complete search history.

(56) References Cited

U.S. PATENT DOCUMENTS

| 4,875,436 A * | 10/1989 | Smith et al. ................ 122/7 R |
| 5,010,051 A * | 4/1991 | Rudy ........................ 502/304 |
| 5,308,810 A * | 5/1994 | Voss et al. .................. 502/28 |
| 5,367,875 A * | 11/1994 | Aboujaoude et al. .......... 60/303 |
| 5,589,142 A | 12/1996 | Gribbon |
| 5,650,127 A * | 7/1997 | Campbell et al. ........ 423/239.1 |
| 5,891,409 A | 4/1999 | Hsiao et al. |
| 5,976,475 A | 11/1999 | Peter-Hoblyn et al. |
| 6,340,002 B1 * | 1/2002 | Liebig ........................ 122/7 R |
| 6,397,582 B1 * | 6/2002 | Hanaoka et al. ............... 60/274 |
| 6,482,762 B1 | 11/2002 | Ruffin et al. |
| 7,182,927 B2 | 2/2007 | Tran et al. |
| 7,390,471 B2 | 6/2008 | Sobolevskiy et al. |
| 7,393,511 B2 | 7/2008 | Tran et al. |
| 2002/0116916 A1 * | 8/2002 | Hofmann et al. .............. 60/282 |
| 2003/0167756 A1 * | 9/2003 | Szymkowicz ................ 60/289 |
| 2005/0034445 A1 * | 2/2005 | Radovich .................. 60/39.182 |

(Continued)

FOREIGN PATENT DOCUMENTS

| CN | 1257435 A | 6/2000 |
| CN | 1743052 A | 3/2006 |

(Continued)

OTHER PUBLICATIONS

European Search Report and Written Opinion, EP10154129, Jun. 24, 2010.

(Continued)

Primary Examiner — Melvin C Mayes
Assistant Examiner — Sheng H Davis
(74) Attorney, Agent, or Firm — Dority & Manning, PA (57) ABSTRACT

A power generating apparatus including a gas turbine engine combusting a fuel in air to produce shaft power and producing a flow of exhaust gases including oxides of nitrogen ($NO_x$), carbon monoxide (CO) and hydrocarbons (HC). An emissions treatment apparatus includes in the exhaust gas flow-path a CO oxidation catalyst disposed at a location with an exhaust gas temperature for which the CO oxidation catalyst advantageously limits $NO_2$ production. The emissions treatment apparatus further includes an ammonia injection apparatus, a mixing section, and a selective catalytic reduction element disposed downsteam of the ammonia injection apparatus and adapted for reduction of $NO_x$.

5 Claims, 7 Drawing Sheets

(56) References Cited

U.S. PATENT DOCUMENTS

| | | |
|---|---|---|
| 2006/0029534 A1* | 2/2006 | Eiteneer et al. ............... 423/237 |
| 2006/0029535 A1* | 2/2006 | Ott ............................. 423/239.2 |
| 2006/0200325 A1* | 9/2006 | Hayashi ............................ 703/2 |
| 2007/0297963 A1 | 12/2007 | Cochran |
| 2008/0112870 A1 | 5/2008 | Moini et al. |
| 2008/0127638 A1* | 6/2008 | Vaarkamp et al. ............... 60/297 |
| 2008/0264033 A1 | 10/2008 | Lacy et al. |
| 2009/0199539 A1* | 8/2009 | Maunula et al. ................ 60/274 |

FOREIGN PATENT DOCUMENTS

| | | |
|---|---|---|
| JP | 6344924 A | 2/1988 |
| JP | 9103648 A | 4/1997 |
| JP | 2003305338 A | 10/2003 |

OTHER PUBLICATIONS

Office Action and Search Report from CN Application No. 201010136461.3 dated Jun. 28, 2013.

* cited by examiner

METHOD AND APPARATUS FOR OPERATION OF CO/VOC OXIDATION CATALYST TO REDUCE NO₂ FORMATION FOR GAS TURBINE

BACKGROUND OF THE INVENTION

The invention relates generally to treatment of emissions in an exhaust path for a combustion system and more specifically to a method and apparatus for reducing $NO_2$ formation in the exhaust path.

Figure 1:
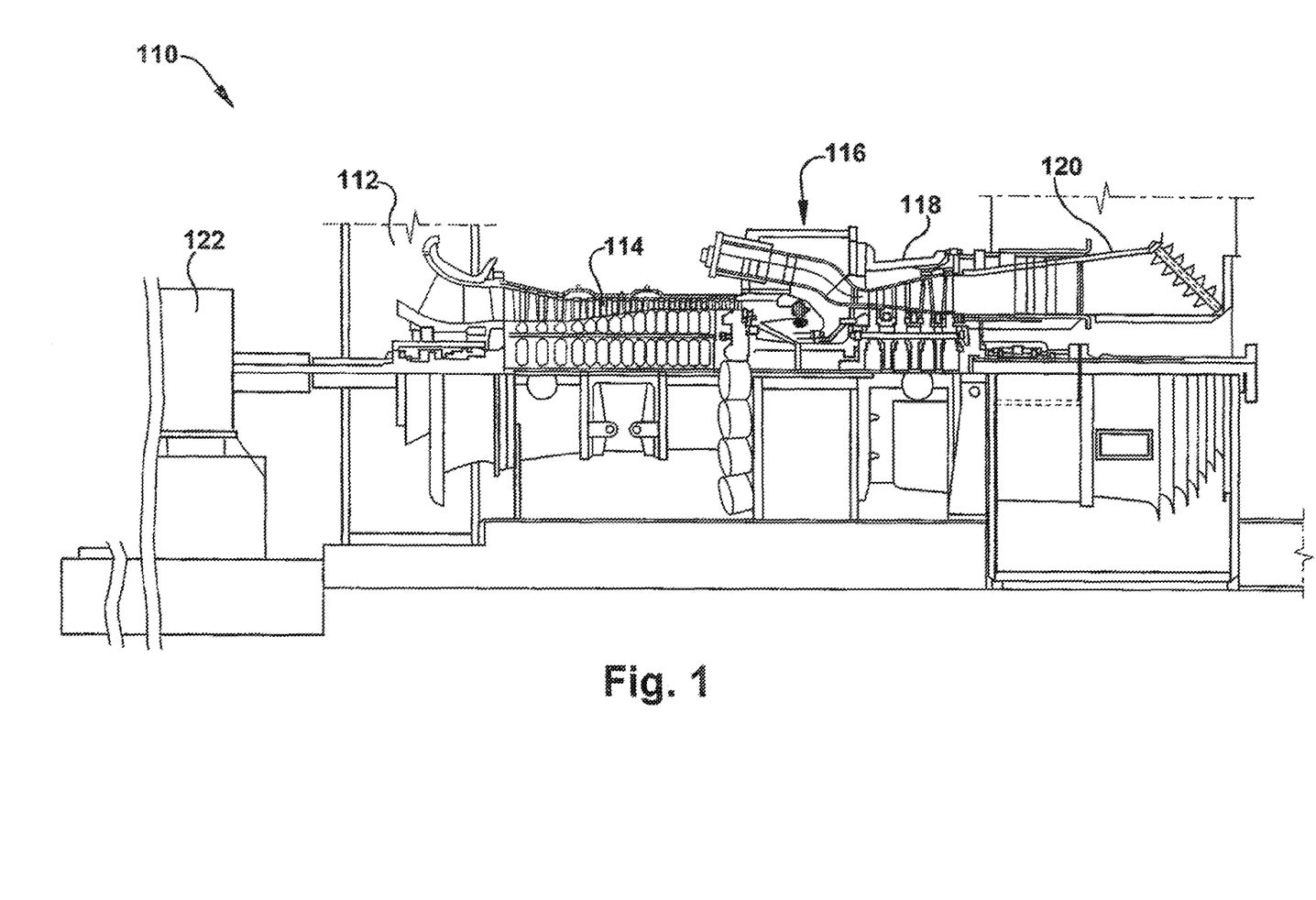
FIG. 1 is a schematic illustration of an exemplary gas turbine system.

FIG. 1 is a schematic illustration of an exemplary gas turbine system 10 including an intake section 112, a compressor section 114 coupled downstream from the intake section 112, a combustor section 116 coupled downstream from the intake section 112, a turbine section 118 coupled downstream from the combustor section 116, and an exhaust section 120. Turbine section 118 is rotatably coupled to compressor section 114 and to a load 122 such as, but not limited to, an electrical generator and a mechanical drive application.

During operation, intake section 112 channels air towards compressor section 114. The compressor section 114 compresses inlet air to higher pressures and temperatures. The compressed air is discharged towards to combustor section 116 wherein it is mixed with fuel and ignited to generate combustion gases that flow to turbine section 118, which drives compressor section 114 and/or load 122. Exhaust gases exit turbine section 118 and flow through exhaust section 120 to ambient atmosphere.

During the combustion of natural gas and liquid fuels, pollutants such as, but not limited to, carbon monoxide (CO), unburned hydrocarbons (UHC), and nitrogen oxides ($NO_x$) emissions may be formed and emitted into an ambient atmosphere. CO and UHC are generally formed during combustion conditions with lower temperatures and/or conditions with an insufficient time to complete a reaction. In contrast, $NO_x$ is generally formed under higher temperatures. At least some known pollutant emission sources include devices such as, but not limited to, industrial boilers and furnaces, larger utility boilers and furnaces, reciprocating engines, gas turbine engines, steam generators, and other combustion systems.

Modern air quality regulations mandate continuingly reduced emission levels for power generating plants, while at the same time fuel efficiency requirements continue to increase. Due to stringent emission control standards, it is desirable to control $NO_x$ emissions by suppressing the formation of $NO_x$ emissions. Nitrous oxides include NO and $NO_2$ where $NO_2$ is known to produce a visible yellow plume from exhaust stacks and further create "acid rain". However, combustion controls alone may prove inadequate to satisfy these often-conflicting goals, and thus continued the improvement of post-combustion exhaust gas treatment systems is desired.

One technology for the control of oxides of nitrogen that is currently being used commercially at large land-based electrical power generating stations is selective catalytic reduction (SCR). The flue gases from a power station have a net oxidizing effect due to the high proportion of oxygen that is provided to ensure adequate combustion of the hydrocarbon fuel. Thus, the oxides of nitrogen that are present in the flue gas can be reduced to nitrogen and water only with great difficulty. This problem is solved by selective catalytic reduction wherein the flue gas is mixed with anhydrous ammonia and is passed over a suitable reduction catalyst at temperatures between about 150-550 degrees C., and preferably between 300-550 degrees C., prior to being released into the atmosphere. The ammonia is not a natural part of the combustion exhaust stream, but rather, it is injected into the exhaust stream upstream of the catalyst element for the specific purpose of supporting one or more of the following reduction reactions in Equations (1) to (3):

$$4NH_3 + 4NO + O_2 \rightarrow 4N_2 + 6H_2O \quad \text{(Equation 1) (fast reaction);}$$

$$4NH_3 + 2NO + 2NO_2 \rightarrow 4N_2 + 6H_2O \quad \text{(Equation 2) (fast reaction); and}$$

$$8NH_3 + 6NO_2 \rightarrow 7N_2 + 12H_2O \quad \text{(Equation 3)}$$
(slow reaction: more catalyst surface required).

The predominate reaction for $NO_x$ removal is Equation (1), assuming the exhaust gas is mostly NO. When the mole ratio of NO to $NO_2$ is greater than 1.0, the reaction of Equation (2) is also fast, reacting equal moles of $NO_x$ to $NH_3$. Higher molar ratios of $NO_2$ are reduced through a much slower reaction of Equation (3) requiring a higher space velocity (longer catalytic reactor bed). The third reaction requires one third more ammonia to reduce $NO_2$ than the second reaction, increasing total ammonia consumption. The $NO_x$ reduction is primarily dependent on temperature. A given catalyst will generally exhibit optimum performance within a temperature range of plus or minus 50 degrees R (Rankine), where flue gas oxygen concentrations exceed one percent. Below this, the catalyst activity is greatly reduced, thus allowing some unreacted ammonia to slip through. Excessive temperatures may also damage the catalyst. Further, above the optimum temperature range, the ammonia itself will be oxidized to form additional $NO_N$ according to Equation (4):

$$4NH_3 + 5O_2 \rightarrow 4NO + 6H_2O \quad \text{(Equation 4).}$$

It is also known to combine an SCR process with a catalytic oxidizing process to treat an exhaust gas flow by oxidizing carbon monoxide to carbon dioxide and by oxidizing hydrocarbons to carbon dioxide and water. The oxidizing process is typically located upstream of the ammonia injection location and upstream of the reducing catalyst, because the oxidizing catalyst will also function to oxidize ammonia, which is undesirable as it decreases the amount of ammonia available for reduction of the $NO_x$ and because it produces additional $NO_x$ compounds.

Figure 2:
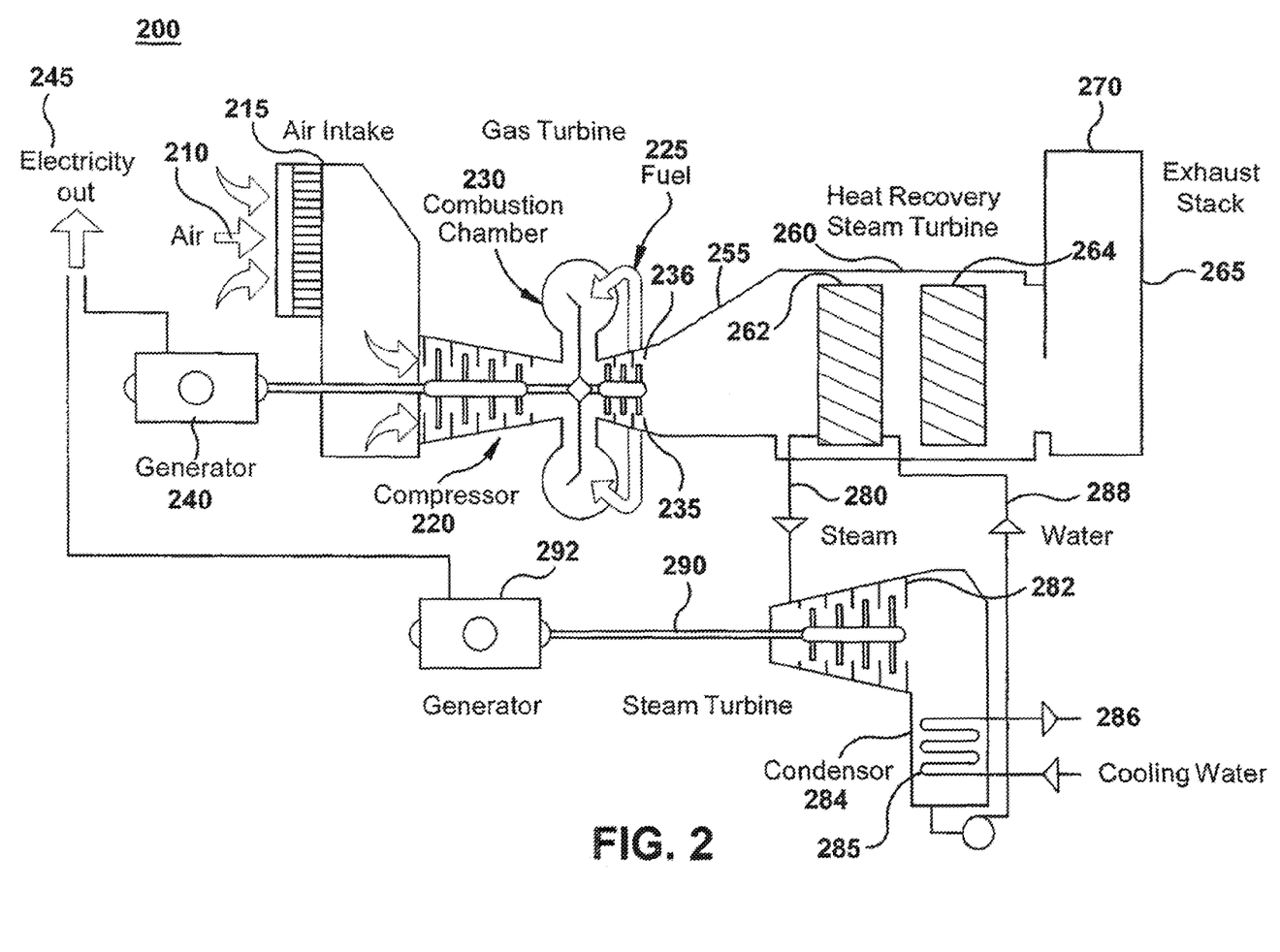
FIG. 2 illustrates a simplified exemplary arrangement of a combined cycle power plant with a heat recovery steam generator (HRSG)

FIG. 2 provides a simplified exemplary illustration of a combined cycle power plant 200. Air 210 is received in air intake 215 of compressor 220 to provide compressed air for mixing with fuel 225 in combustors 230 to supply hot gases to gas turbine 235 for driving shaft 236 connected to generator 240 for producing electricity output 245. Exhaust gases 250 are discharged into exhaust duct 255, through heat recovery steam generator 260 and out through stack 265 to atmosphere 270. The heat recovery steam generator (HRSG) includes heat exchangers 262 to extract heat from the exhaust gases 250 and emissions treatment equipment 264 for emission controls. The heat extracted from the exhaust gases is used to generate steam 280. The steam 280 is supplied to steam turbine 282 to drive shaft 290 of generator 292 for producing electricity. The steam 280 then passes to condenser 284 where cooling water 286 passing through tube bundles condenses the steam to water 288. The water 288 is then returned to the HRSG for completion of a closed cycle. An operating HRSG may include multiple heat exchangers and evaporators, steam systems and water systems for producing steam at different pressures and temperatures in many different configurations. Similarly, the emissions treatment equipment may include multiple treatment elements within the HRSG and adapted to address different pollutants in different ways.

Arrangement of the above-described catalytic elements may influence the overall performance in treatment of $NO_x$ and other emissions being discharged into the atmosphere.

Therefore, a need exists to arrange such elements to reduce discharge of $NO_x$ and other discharged pollutants.

BRIEF DESCRIPTION OF THE INVENTION

The present invention relates to a method and apparatus for operation of a CO/VOC oxidation catalyst to minimize $NO_2$ formation in an exhaust flowpath for a combustion system.

Briefly in accordance with one aspect of the present invention, a power generating apparatus is provided. The power generating apparatus includes a gas turbine engine combusting a fuel in air to produce shaft power and producing a flow of exhaust gases including oxides of nitrogen ($NO_x$), carbon monoxide (CO) and hydrocarbons (HC). An emissions treatment apparatus is adapted for receiving the flow of exhaust gases prior to releasing the exhaust gases to the atmosphere.

The emissions treatment apparatus includes, relative to a flowpath of the exhaust gases, a carbon monoxide (CO) oxidation catalyst disposed at a location in the gas turbine exhaust path adapted for limiting $NO_2$ production from NO by the CO oxidation catalyst affected by placement at a location with an exhaust gas temperature for which the CO catalyst advantageously limits $NO_2$ production. The emissions treatment apparatus further includes an ammonia injection apparatus (MG) disposed downsteam from the CO reduction catalyst and adapted for injecting ammonia into a flow of exhaust gases, a mixing section disposed downstream of the ammonia injection apparatus and adapted for mixing injected ammonia with the flow of exhaust gases, and a selective catalytic reduction (SCR) element disposed downsteam of the ammonia injection apparatus adapted for reduction of $NO_x$ in the flow of exhaust gases.

In accordance with another aspect of the present invention, a method for arrangement of catalytic elements for treating emissions in an exhaust gas flow from a gas turbine is provided. The method includes disposing a carbon monoxide (CO) oxidation catalyst at a location in an exhaust gas path adapted for limiting $NO_2$ production from NO by the CO oxidation catalyst by placement at a location with a turbine exhaust temperature for which the CO catalyst advantageously limits $NO_2$ production. The method further includes disposing an ammonia injection grid (AIG) downstream from the CO oxidation catalyst within the exhaust gas flow, disposing a mixing chamber downstream from the AIG; and disposing a selective catalytic reduction (SCR) catalytic element downstream from the mixing chamber.

In accordance with a further aspect of the present invention, a combustion system is provided. The combustion system includes at least one of a furnace, a boiler and a gas turbine engine, adapted for combusting a fuel in air to produce shaft power and producing a flow of exhaust gases including oxides of nitrogen ($NO_x$), carbon monoxide (CO) and hydrocarbons (HC). An emissions treatment apparatus is also provided, adapted for receiving exhaust gases prior to releasing the exhaust gases to the atmosphere.

The treatment apparatus includes relative to a flowpath of the exhaust gases a carbon monoxide (CO) oxidation catalyst, wherein the CO oxidation catalyst is advantageously disposed in the exhaust path at a location adapted for limiting $NO_x$ production by the CO oxidation catalyst according to a selected range of temperatures at the location. The treatment apparatus further includes an ammonia injection apparatus (AIG) disposed downsteam from the CO reduction catalyst and adapted for injecting ammonia into a flow of exhaust gases, a mixing section disposed downstream of the ammonia injection apparatus and adapted for mixing injected ammonia with the flow of exhaust gases, and a selective catalytic reduction (SCR) element disposed downsteam of the ammonia injection apparatus adapted for reduction of $NO_x$ in the flow of exhaust gases.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including substantial reduction of the $NO_2$ concentration in the exhaust stream over existing exhaust gas catalytic arrangements, leading to reduced $NO_2$ emissions to the atmosphere. Such $NO_2$ reductions may result in elimination of a "yellow plume" associated with elevated concentration of $NO_2$ in atmospheric exhaust. The present invention may also lead to enhanced oxidation of volatile organic compounds (VOC) and unburned hydro carbons (UBC). Yet further, the present invention may result in reduced ammonia (NH3) consumption and reduced SCR catalyst surface area for removing $NO_x$ from the exhaust stream. The smaller required ammonia injection and SCR catalyst complex may result in a decreased pressure drop in the exhaust gas flow leading to greater output power from the gas turbine for a given fuel input.

Figure 3:
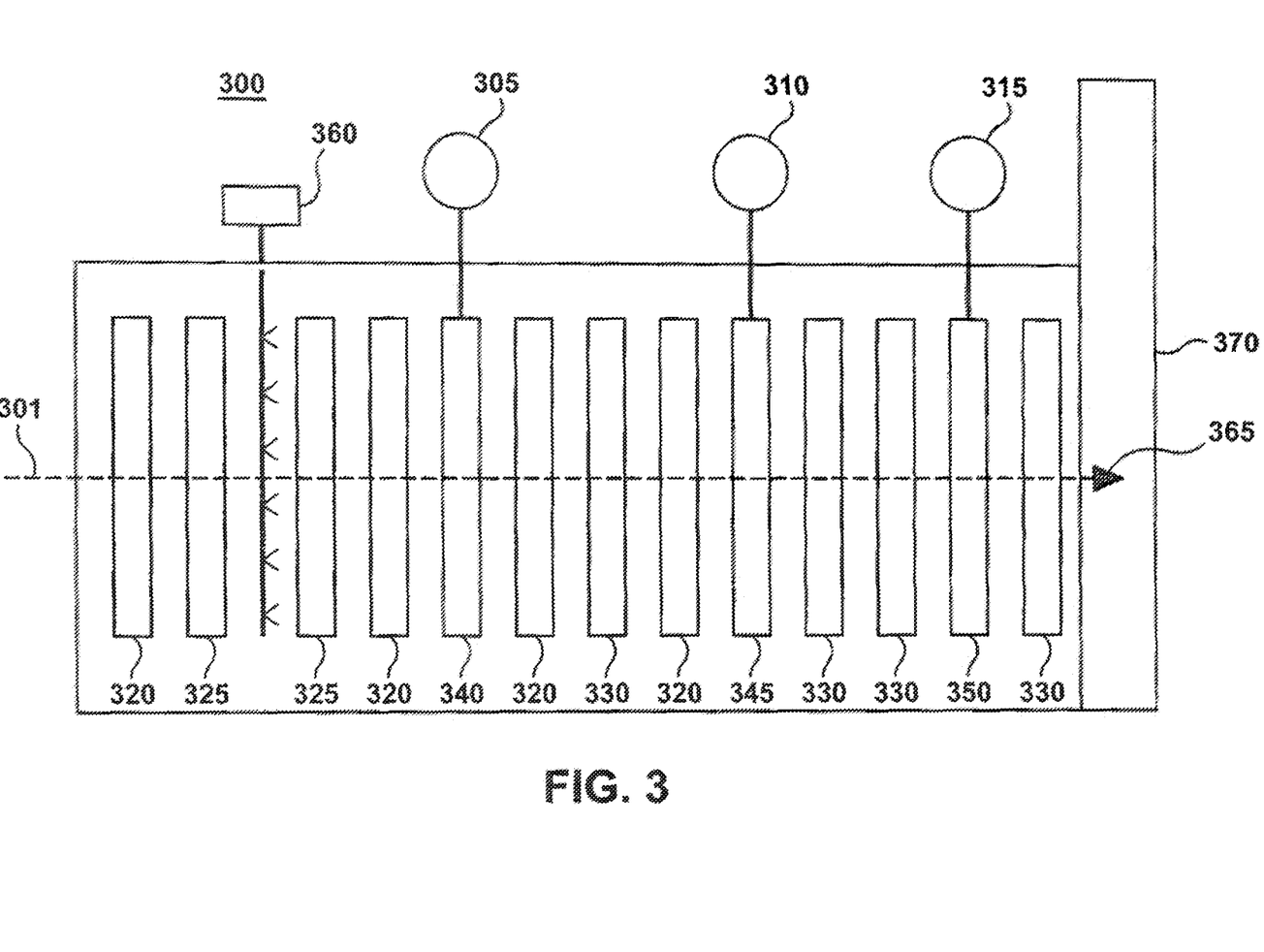
FIG. 3 illustrates an internal arrangement of heat transfer equipment within an exemplary HRSG.

FIG. 3 illustrates an internal arrangement of heat transfer equipment within an exemplary HRSG. HRSG 300 is adapted for generating steam at three pressures in a high pressure drum 305, and intermediate pressure drum 310 and a low pressure drum 315 which may then be supplied to a high pressure steam turbine, an intermediate pressure steam turbine and a low pressure steam turbine (turbines not shown). The HRSG receives the exhaust output from the gas turbine discharge 301. The HRSG 300 includes a plurality of superheater heat exchangers 320, reheater heat exchangers 325, and economizer heat exchangers 330. The HRSG also includes high pressure evaporator 340, an intermediate pressure evaporator 345 and a low pressure evaporator 350 adapted for producing steam for the associated high pressure drum 305, and intermediate pressure drum 310 and a low pressure drum 315. The HRSG 300 also includes a duct burner 360 for supplying heat to exhaust gas flow 365 in order to enhance steam production output. Each of the above-described heat exchangers and evaporators removes heat and lowers temperature for the exhaust gases while the duct burners add heat and increase temperature. The emissions treatment equipment (not shown) may be placed in the exhaust gas flow 365 among the heat exchangers, evaporators and burners to advantageously locate the CO oxidation catalyst for reduced $NO_2$ production and discharge out exhaust stack 370. HRSGs for use with gas turbine and other combustion systems may include other numbers and arrangements of evaporators and heat exchangers suited for the particular application.

Figure 4:
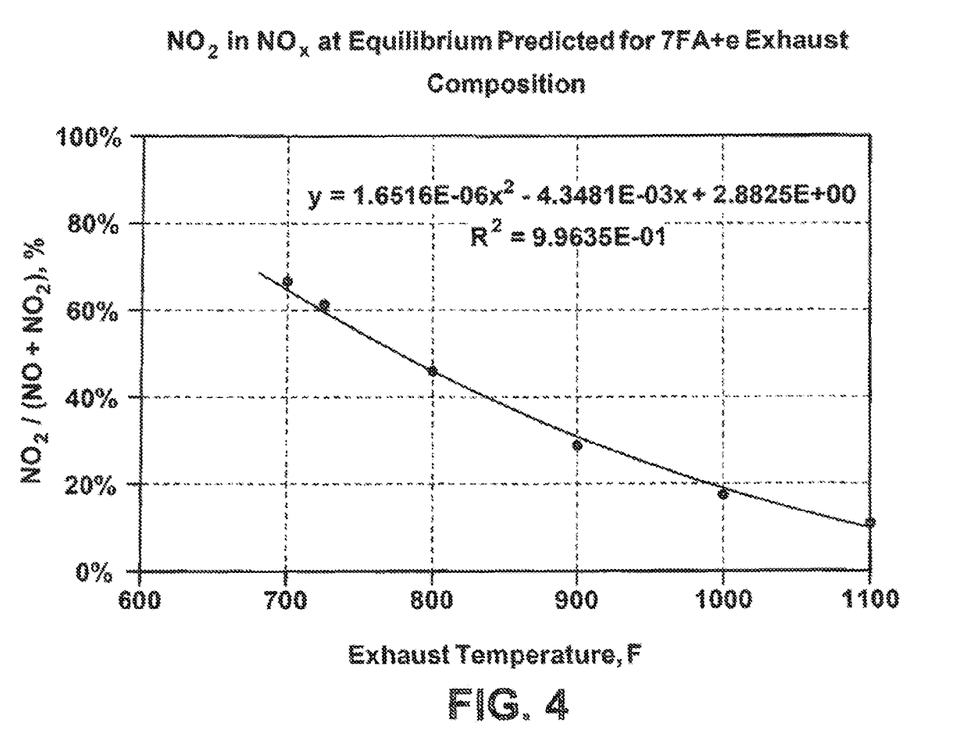
FIG. 4 illustrates $NO_2$ percentage of total $NO_x$ in an exhaust stream for an exemplary gas turbine.

FIG. 4 illustrates a curve 490 representing the an equilibrium $NO_2$ percentage of total $NO_x$ in an exhaust stream for an exemplary gas turbine, such as a 7FA+e™ by the General Electric Co., as a function of exhaust gas temperature. Lower exhaust gas temperature favors a higher proportion of $NO_2$ in $NO_x$ at equilibrium. For an exhaust gas temperature of about 650 degrees F., $NO_2$ comprises approximately 80% of the total $NO_x$. At exhaust gas temperatures above about 1100 degrees F., $NO_2$ comprises only approximately 10% of the total $NO_x$.

Figure 5:
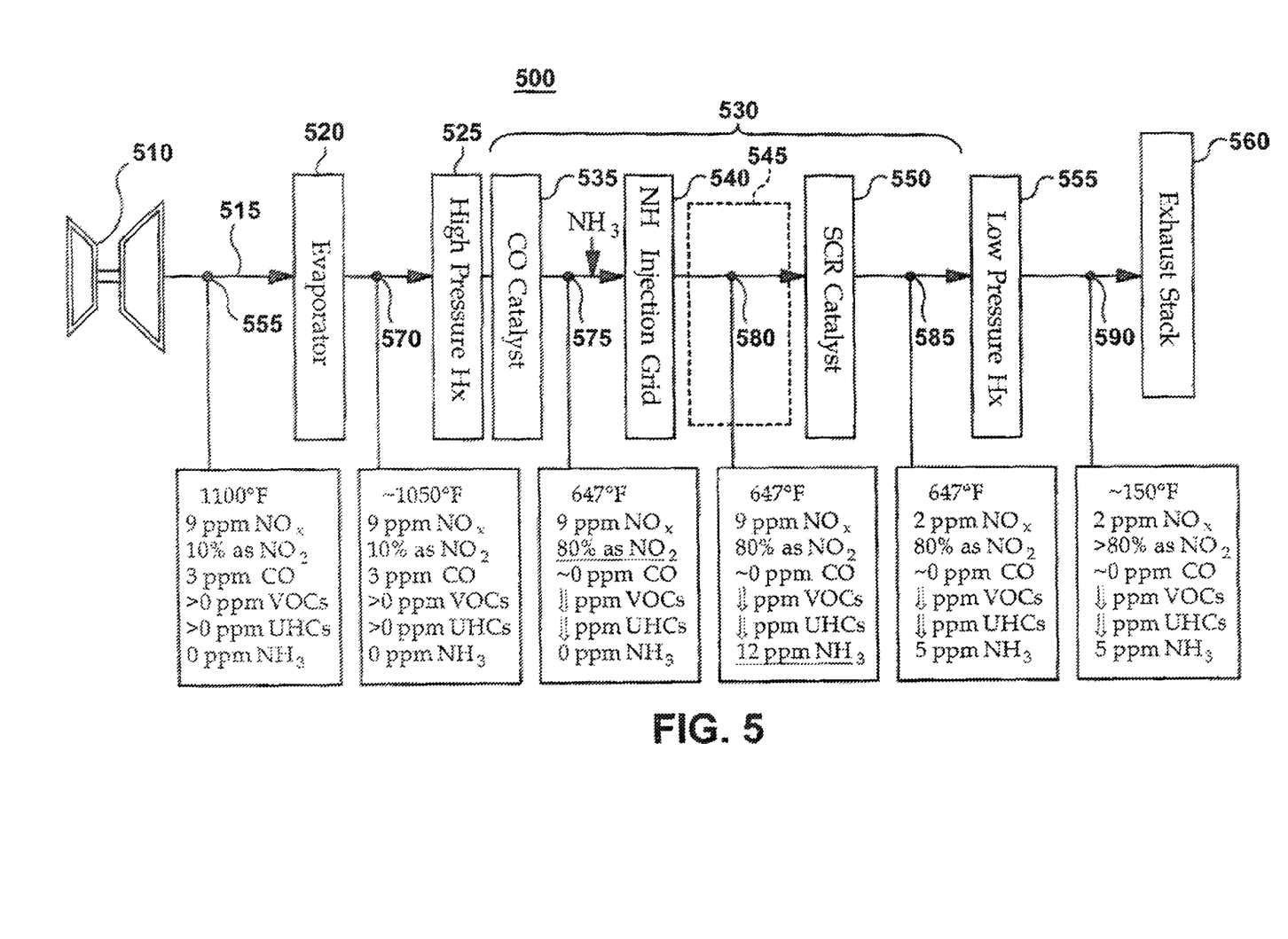
FIG. 5 illustrates an emissions profile through an exemplary HRSG with a prior art placement of a CO oxidation catalyst.

FIG. 5 illustrates an emissions profile through an exemplary HRSG 500 with a prior art placement of a CO oxidation catalyst. An exhaust 515 from gas turbine 510, such as a 7FA +e by General Electric Co., is supplied through evaporator heat exchanger 520 and high pressure heat exchanger 525 to emissions treatment equipment 530. The emissions treatment equipment may include a standard CO catalyst 535 of platinum, platinum/palladium or the like. The emissions treatment equipment may also include an ammonia (NH3) injection grid 540, a mixing section 545 and a SCR catalyst 550. The HRSG may include further downstream heat exchangers such as a low pressure heat exchanger 555. The exhaust gas flow discharges to atmosphere through stack 560. Typically, the individual elements of the emissions treatment equipment 530 are maintained in physical proximity to each other. Such physical proximity allows the emissions treatment equipment to be housed in a single enclosure and facilitates a single contracting entity experienced in emissions control to make the installation, saving time and capital expenditure.

Table I provides typical exemplary, non-limiting temperature and emissions concentration in the exhaust gas flow 515 from the gas turbine 510 at locations within the exhaust stream upstream 555 and downstream 570 of evaporator; downstream of high pressure heat exchanger and CO catalyst 575; within mixing chamber 580; downstream of SCR catalyst 585; and downstream of low pressure heat exchanger 590.

TABLE I

TEMPERATURE AND EMISSIONS OF EXHAUST GAS FLOW IN HRSG

| | Location | | | | | |
|---|---|---|---|---|---|---|
| | 565 | 570 | 575 | 580 | 585 | 590 |
| ° F. | 1100 | 1050 | 647 | 647 | 647 | 150 |
| $NO_x$ ppm | 9 | 9 | 9 | 9 | 2 | 2 |
| $NO_2$ % | 10 | 10 | 80 | 80 | 80 | >80 |
| CO ppm | 3 | 3 | ~0 | ~0 | ~0 | ~0 |
| VOC ppm | >0 | >0 | reduced | reduced | reduced | reduced |
| UHC ppm | >0 | >0 | reduced | reduced | reduced | reduced |
| $NH_3$ ppm | 0 | 0 | 0 | 12 | 5 | 5 |

The exhaust gas path through the HRSG as previously described in FIG. 5 has several distinct drawbacks that have not heretofore been recognized and addressed. Most particularly, placement of the CO oxidation catalyst has been in an arrangement with the $NH_3$ injection apparatus, mixing chamber and SCR catalyst, emphasizing packaging of treatment equipment. Such arrangements have located the package at a location in the exhaust stream with exhaust air temperature advantageous to the SCR catalyst operation, but decidedly disadvantageous to the performance of the CO catalyst with respect to generation of $NO_2$.

More specifically, $NO_2$ concentration in the gas turbine exhaust can be increased several fold by oxidation of NO over existing CO oxidation catalyst. The CO oxidation catalyst oxidizes NO to equilibrium concentrations of $NO_2$ at local exhaust temperatures at the location of CO oxidation catalyst in the exhaust gas stream. $NO_2$ concentration is increased over five fold at the exhaust gas temperature at the CO catalyst location in the HRSG, just upstream of the SCR ammonia injectors (from about 10% of total $NO_x$ to about 80% of total $NO_x$). Increasing the $NO_2$ concentration can increase "yellow plume" from the stack discharge as $NO_2$ creates the yellow color observed. Increasing the $NO_2$ concentration will necessitate an increase of the selective catalytic reduction (SCR) catalyst size, pressure loss (heat rate) and ammonia usage for $NO_x$ reduction especially at exhaust temperatures below about 750 degrees F.

Typical CO oxidation catalysts operate durably at temperatures up to about 1400 degrees F., which may occur in HRSG exhaust gas stream. Therefore, placement of the CO oxidation catalyst within the exhaust stream at a location with a temperature range for the exhaust gas stream of about 750 degrees F. to about 1400 degrees F. will substantially reduce $NO_2$ production by the catalyst. Moreover, the preferential placement of the CO catalyst within the exhaust gas stream at a temperature range of between approximately 950 degrees F. and approximately 1400 degrees F. may provide for durable CO oxidation catalyst life and at the same time provide a maximum allowable $NO_2$ fraction that does not increase SCR catalyst rate or NH3 usage.

Advantageous placement of the CO oxidation catalyst within the exhaust stream with respect to temperature, therefore will have a significant positive impact on the amount of $NH_3$ needed for reduction of $NO_x$ and the size needed for the SCR catalyst. Smaller catalyst size and reduced $NH_3$ utilization for the same $NO_2$ ppm output from the exhaust stack can result in substantial cost savings, as well as reduced pressure drop in the exhaust gas flow allowing more power output from the combined cycle gas turbine or fuel savings for the same power output.

Figure 6:
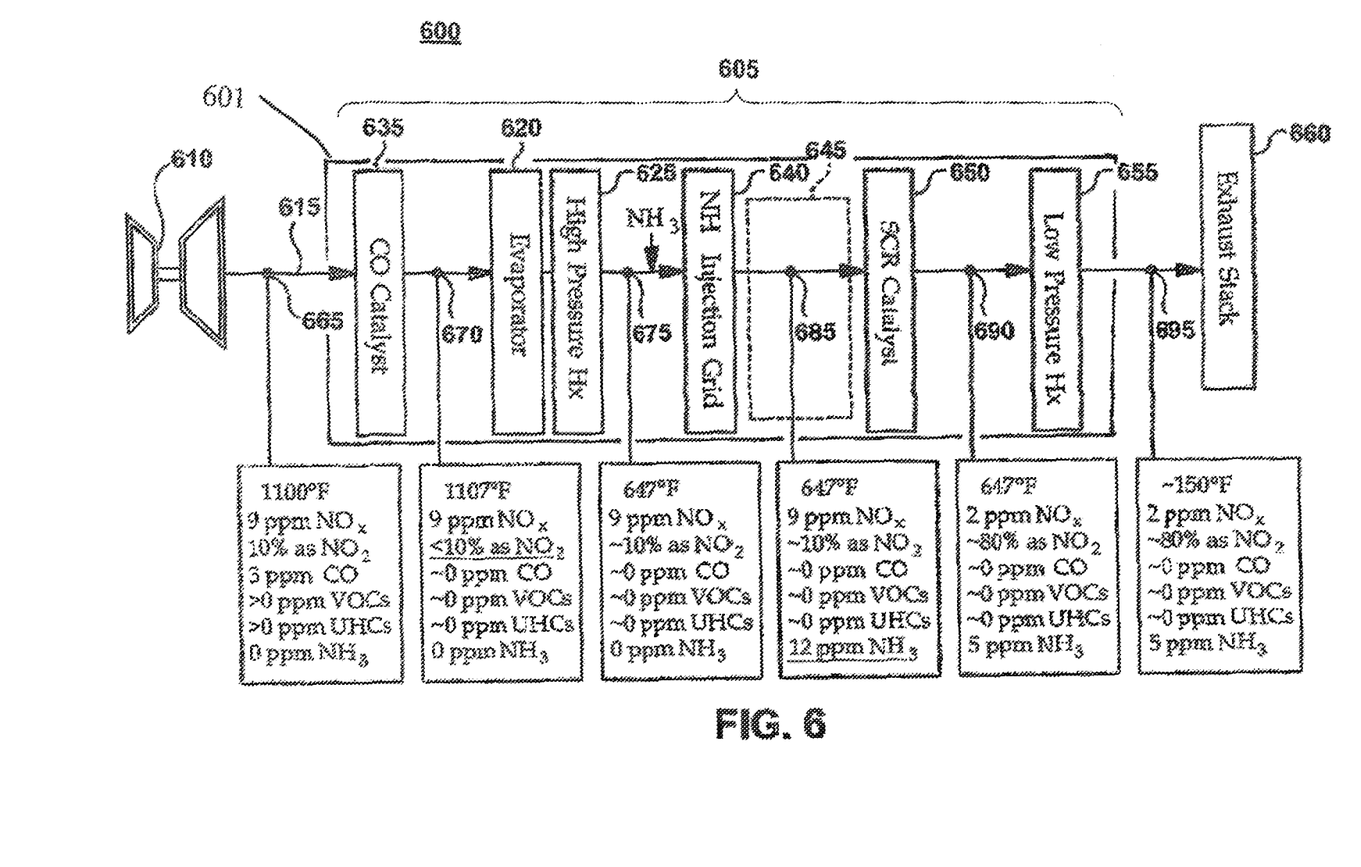
FIG. 6 illustrates an emissions profile through an exemplary HRSG with an embodiment for an inventive placement of a CO oxidation catalyst.

FIG. 6 illustrates advantageous placement of the CO oxidation catalyst 620 of emissions treatment apparatus 605 of HRSG 601 of power generating apparatus 600 for comparison with the HRSG configuration of FIG. 5. In FIG. 6, the CO oxidation catalyst 635 is positioned upstream from the high-pressure evaporator 620 and high-pressure heat exchanger 625, locating the catalyst directly at the outlet of the gas turbine 610 in this example. The exhaust gas temperature at the outlet of the gas turbine 610 is approximately 1110 degrees F. The $NH_3$ injection grid 640, mixing chamber 645 and SCR catalyst 650 are placed downstream of the high-pressure evaporator 620 and high-pressure heat exchanger 625 at a temperature for the exhaust gas stream 615 of about 647 degrees F. Here the separation between the CO oxidation catalyst 635 and the SCR catalyst 650 locates each within an exhaust gas flowpath temperature range for reduced $NO_2$ discharge to atmosphere up exhaust stack 660.

Table II provides typical exemplary, non-limiting temperature and emissions concentration in the exhaust gas flow 615 from the gas turbine 610 when the CO oxidation catalyst 635 is placed in the at a location wherein the temperature of exhaust gas flow 615 and such placement advantageously reduces NO2 being discharged up the exhaust stack 660. As with Table 1, exhaust gas temperature, and concentration of $NO_x$, CO, VOC UHC and $NH_3$ and percent NO2 of total NOx are provided at locations within the exhaust stream flow 615 at upstream location 665 and downstream location 670 of the CO oxidation catalyst 635, high-pressure evaporator 620; downstream location 675 of the evaporator 520 and the high-pressure heat exchanger 625 at location 575, within location 685 the mixing chamber 645; downstream 690 of SCR catalyst 650; and downstream 695 of low pressure heat exchanger 655.

TABLE II

TEMPERATURE AND EMISSIONS OF EXHAUST GAS FLOW IN HRSG WITH ADVANTAGEOUS PLACEMENT OF CO OXIDATION CATALYST

| | Location | | | | | |
|---|---|---|---|---|---|---|
| | 665 | 670 | 675 | 685 | 690 | 695 |
| ° F. | 1100 | 1107 | 647 | 647 | 647 | 150 |
| $NO_x$ ppm | 9 | 9 | 9 | 9 | 2 | 2 |
| $NO_2$ % | 10 | <=10 | ~10 | ~10 | 80 | 80 |
| CO ppm | 3 | ~0 | ~0 | ~0 | ~0 | ~0 |
| VOC ppm | >0 | ~0 | ~0 | ~0 | ~0 | ~0 |
| UHC ppm | >0 | ~0 | ~0 | ~0 | ~0 | ~0 |
| $NH_3$ ppm | 0 | 0 | 0 | 12 | 5 | 5 |

At the turbine outlet 665, the exhaust gas flow temperature is about 1110 degrees F. The turbine exhaust delivers about 9 PPM $NO_x$ with about 10% in the form of $NO_2$. The CO catalyst at 1110 degrees F. will oxidize NO to $NO_2$ only to the equilibrium NO2 of about 10% at this exhaust temperature (see FIG. 4) so the downstream concentrations of $NO_x$ will remain at about 9 PPM with about 10% being $NO_2$. At the input of the SCR catalyst, only 10% (0.9 PPM) of the 9-PPM $NO_x$ will be $NO_2$. Consequently, the usage of injected $NH_3$ and the required size of the SCR catalyst are substantially reduced.

For existing HRSGs, the temperature drops associated with each heat exchanger may be fairly fixed by the existing design. Modifying the CO oxidation catalyst placement within an existing HRSG for improvement of $NO_2$ emissions, may require choosing locations for physical placement adaptable for the CO oxidation catalyst and accepting the temperatures available at those locations. Such modification may incur some significant capital costs, however such costs may be recouped through lower SCR catalyst cost, lower $NH_3$ utilization and reduced fuel costs associated with a lower back pressure in a scaled down SCR catalyst that is possible with the lower percentage input of $NO_2$. For implementation of advantageous placement of the CO oxidation catalyst in a new HRSG, the physical arrangement may be designed initially for incorporation at a location of desired exhaust gas stream temperature.

Advantageous placement of the CO oxidation catalyst may further be considered in combustion systems that do not employ HRSGs. These exhaust streams also require emission treatment for $NO_x$ as previously described. Such systems may include heaters and/or coolers for establishing appropriate temperatures within the exhaust gas stream for treatment and may further include both CO oxidation catalysts and $NH_3$—SCR catalyst systems. Therefore advantageous placement of the CO oxidation catalyst with respect to the temperature of the exhaust gas stream, as previously described, may provide similar advantages to those previously described with respect to the placement within the HRSG. Further, while the placement of the CO oxidation catalyst with respect to advantageous temperatures in the exhaust gas path has been described with respect to gas turbine systems, such advantageous placement is also applicable to the gas exhaust path for furnaces, boilers and other combustion systems.

Other benefits may be realized by moving the CO oxidation catalyst to the highest exhaust gas temperature region before the HRSG heat exchangers. Higher exhaust gas temperature would enable durable formaldehyde oxidation over the CO catalyst, where as the typical location may not be hot enough for durable formaldehyde oxidation. $NO_x$ may be reduced over the CO platinum based catalyst during lower load operation due to well known "hydrocarbon SCR" reactions of CO, UHCs with $NO_x$. Moving the CO oxidation catalyst away from the ammonia injection grid should also increase the upstream turbulence, resulting in better ammonia distribution before the SCR, so that the total ammonia injection and slip could be reduced to achieve the same $NO_x$ stack emissions. In a like manner, the typical honeycomb CO catalyst support can aid in producing a more uniform, axial velocity profile entering the downstream heat exchanger elements.

Figure 7:
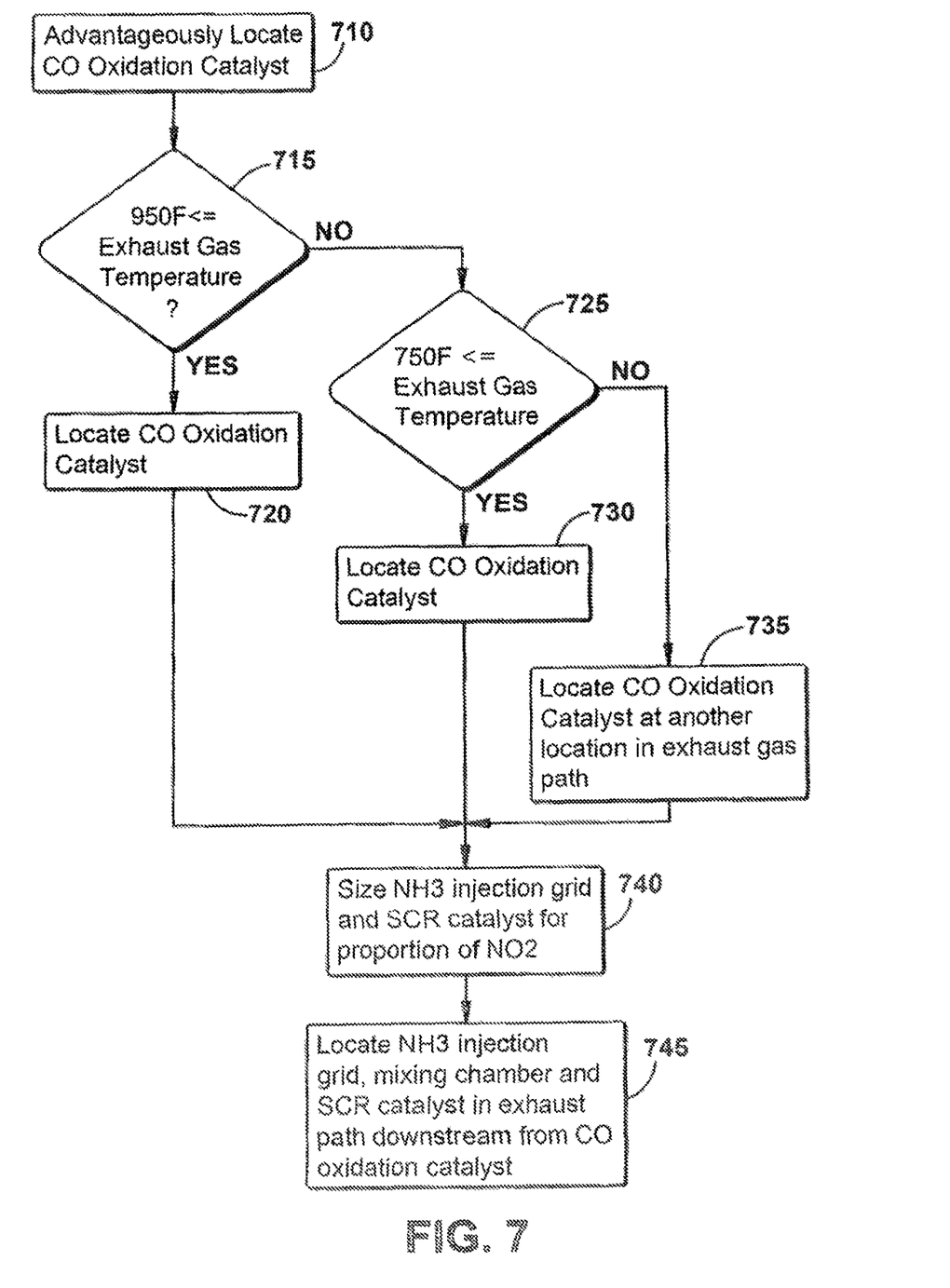
FIG. 7 illustrates a flowchart for a method of treating emissions in an exhaust gas flow from a gas turbine.

Another aspect of the present invention provides a method for treating emissions in an exhaust gas flow from a gas turbine. FIG. 7 illustrates a flowchart for a method of treating emissions in an exhaust gas flow from a gas turbine. The method for treating emissions in an exhaust gas flow from a gas turbine includes disposing a carbon monoxide (CO) oxidation catalyst at a location in an exhaust gas path adapted for limiting $NO_2$ production from NO by the CO oxidation catalyst by placement at a location with a turbine exhaust temperature for which the CO oxidation catalyst advantageously limits $NO_2$ production according to step 710. The location for the advantageous disposition of the CO oxidation catalyst falls at a temperature range of the gas turbine exhaust above approximately 750 degrees F. and preferentially above 950 degrees F. In step 715 it is determined if the CO oxidation catalyst may be physically located in the exhaust path at a location with a local exhaust gas temperature above 950 degrees F. If such a location can be provided, the CO oxidation catalyst is preferably placed there in step 720. Otherwise in step 725, it is determined if the CO oxidation catalyst can be placed at a location in the exhaust path for which the exhaust gas temperature falls above approximately 750 degrees F. If such placement is possible, then in step 730 the CO oxidation catalyst may be placed at the highest feasible temperature within the range for the purpose of limiting NO2 production. Otherwise in step 735, the CO oxidation catalyst is placed at an available location upstream from the AIG.

The method further includes according to step 740 sizing the AIG, the mixing chamber and the SCR catalyst for the expected proportion of $NO_2$ in the exhaust gas stream based on the temperature of the exhaust gas stream at the location of CO catalyst placement. In step 745 the AIG, the mixing chamber and the SCR catalyst are disposed downstream from the CO oxidation catalyst.

The method may further include disposing the CO oxidation catalyst advantageously in the gas turbine exhaust path at the outlet of the gas turbine without at least one of an intervening heating element and an intervening cooling element. The method may also include disposing at least one of an attemperator adapted for cooling the exhaust gas flow wherein the CO oxidation catalyst is advantageously disposed downstream in the exhaust gas flow from the attemperator and an exhaust heater adapted for heating the exhaust gas flow wherein the CO oxidation catalyst is advantageously disposed downstream in the exhaust gas flow from the exhaust heater.

The method may also include disposing the CO oxidation catalyst at a location within a heat recovery steam generator (HRSG), wherein the HRSG includes at least one of a high-pressure evaporator, a low-pressure evaporator, and a plurality of heat exchangers within the exhaust gas path. The CO oxidation catalyst may be disposed upstream of the high-pressure heat exchanger. The CO oxidation catalyst may disposed downstream of the high-pressure heat evaporator. The CO oxidation catalyst at a location within a heat recovery steam generator (HRSG) downstream of at least one of the plurality of heat exchangers. Such placement, according to the temperature of the exhaust gas at said location, limits the oxidation of NO to $NO_2$.

While various embodiments are described herein, it will be appreciated from the specification that various combinations of elements, variations or improvements therein may be made, and are within the scope of the invention.

The invention claimed is:

1. A method for arranging catalytic elements for treating emissions in a flow of exhaust gases from a gas turbine, comprising:
   disposing a carbon monoxide (CO) oxidation catalyst at a location downstream from an exhaust duct of the gas turbine between the exhaust duct and a high pressure heat exchanger in a flow of exhaust gases for limiting NO2 production from NO by the CO oxidation catalyst by placement of the CO oxidation catalyst directly at the exhaust outlet of the exhaust duct without at least one of an intervening heating element and an intervening cooling element;
   disposing an ammonia injection grid (AIG) downstream from the CO oxidation catalyst and the high pressure heat exchanger within the exhaust gas flow;
   disposing a mixing chamber downstream the from the AIG; and
   disposing a selective catalytic reduction (SCR) catalytic element downstream from the mixing chamber.

2. The method according to claim 1, the step of disposing the CO oxidation catalyst further comprising:
   disposing the CO oxidation catalyst at a location wherein the exhaust gas temperature range is between approximately 750 degrees F. and approximately 1250 degrees F.

3. The method according to claim 2, the step of disposing the CO oxidation catalyst further comprising:
   disposing the CO oxidation catalyst at a location wherein the exhaust gas temperature is above approximately 950 degrees F.

4. The method according to claim 1, the step of disposing the CO oxidation catalyst further comprising:
   disposing the CO oxidation catalyst at a location within a heat recovery steam generator (HRSG) including a high pressure evaporator and at least one of a low pressure evaporator and a plurality of heat exchangers within the flow of exhaust gases, wherein the CO oxidation catalyst is disposed upstream of the high pressure evaporator.

5. The method according to claim 4, the step of disposing the CO oxidation catalyst further comprising:
   disposing the CO oxidation catalyst at a location within a heat recovery steam generator (HRSG) upstream of at least one of the plurality of heat exchangers.

* * * * *